United States Patent [19]

Wales et al.

[11] Patent Number: 4,716,978
[45] Date of Patent: Jan. 5, 1988

[54] PAPER MONITORING SYSTEM

[75] Inventors: R. Langdon Wales, Lincoln; H. W. Crowley, Newton, both of Mass.

[73] Assignee: Automation, Inc., Needham, Mass.

[21] Appl. No.: 807,541

[22] Filed: Dec. 11, 1985

[51] Int. Cl.$^4$ ............................................. G01G 23/22
[52] U.S. Cl. ........................................ 177/25; 177/1; 364/567
[58] Field of Search ............... 177/17, 25, 1; 364/403, 364/567

[56] References Cited

U.S. PATENT DOCUMENTS

| | | | |
|---|---|---|---|
| 3,863,724 | 2/1975 | Dalia, Jr. ............................... | 177/25 |
| 4,419,734 | 12/1983 | Wolfson et al. ................. | 364/403 X |
| 4,425,974 | 1/1984 | Kipp .................... | 177/25 X |
| 4,479,559 | 10/1984 | Wales et al. ...................... | 177/25 X |
| 4,563,739 | 1/1986 | Gerpheide et al. ............... | 177/25 X |

Primary Examiner—George H. Miller, Jr.
Attorney, Agent, or Firm—Wolf, Greenfield & Sacks

[57] ABSTRACT

A system for monitoring paper consumption in association with a web printing press having the capability of monitoring paper delivered to the press from multiple rolls. An input waste scale having a waste bin thereon provides for the continuous registration of waste in sequence from the multiple rolls. Separate control circuits are provided, each responsive to the scale signal for sensing increments in scale weight for each respective roll to provide a total of waste weight per roll. Control is provided including means operator initiated for enabling only one of the control circuits for sensing so as to accumulate waste weight only associated with a selected roll.

30 Claims, 7 Drawing Figures

PAPER MONITORING SYSTEM

BACKGROUND OF THE INVENTION

The present invention relates in general to a paper monitoring system and pertains, more particularly, to an automatic system for the monitoring of paper products. The system of the present invention may be used in the monitoring of paper in conjunction with a printing press or may also be used in other industries in which material is consumed in web form such as in the textile and packaging industries.

In certain processes it is desirable to monitor the utilization of materials. A specific example of this is in the printing industry in association with a printing press that uses rolls of paper, often referred to as a web press. In order to properly account for paper usage it is desirable to determine the amount of paper consumed and to furthermore differentiate between paper that is consumed in the press and paper that is discarded as waste.

In the printing industry it is common to employ a hoist scale for weighing a roll of paper before it is mounted into the press. Usually this weighing takes place after the outer covering layer has been removed from the roll. This technique provides an initial roll weight. However, the problem is that further paper may be discarded when or after the roll is mounted in the machine. Furthermore, at high rates of production, this use of a hoist scale creates a bottleneck to production.

The rolls of paper are typically provided with a weight stamped on the outer wrapper by the maker of the paper. One technique is to use a separate small capacity scale in which all scraps from a particular roll are weighed. After all of the waste from the roll is weighed on this small scale a button is pushed to record the waste as an entry pertaining to a particular roll and then the paper is removed from the scale into a waste bin. This technique is troublesome in that it requires an extra step for the operator and it also requires that all waste be disposed on this small scale. It is quite easy to circumvent the technique because people will tend to put waste directly into the waste bin.

Accordingly, it is an object of the present invention to provide an improved system for monitoring paper consumption or other material consumption and particularly as it comes in web form.

A further object of the present invention is to provide an improved system for the monitoring of paper particularly waste paper from a roll of paper that is introduced into a printing press.

Another object of the present invention is to provide an improved paper monitoring system in which both total roll weight is accounted for as well as the signatures from the press so as to provide a final basis weight or weight per unit area of the output signatures. The weight per unit area of the output signatures may also be expressed as signatures produced per pound of paper.

Still another object of the present invention is to provide an improved automatic monitoring system for paper in connection with a web printing process and which readily takes into account paper consumed due to web breaks.

SUMMARY OF THE INVENTION

To accomplish the foregoing and other objects, features and advantages of the invention, there is provided a system for monitoring paper consumption in association with a web printing press that has the capability of monitoring paper delivery to the press from multiple rolls. In accordance with the system of the invention, there is provided an input waste scale and an input waste bin adapted to be disposed on the input waste scale. The input waste scale provides for the continuous registration of waste in sequence from the multiple rolls and has an output signal that is continuously representative of input weight. Separate means are provided, each responsive to the scale signal for sensing separate increments in scale weight for each respective roll to provide a total of waste weight per roll. Control means are provided including means operator initiated, such as at a keyboard of the system for enabling only one of the these separate means for sensing, so as to accumulate waste weight only associated with a selected roll. The net weight of paper that is delivered to the printing press is equal to the weight of paper placed in the machine minus the roll weight at removal. If all waste associated with a particular roll is kept track of, on a per roll basis, then, knowing the original weight stamped on the roll, one can then easily determine the net weight of paper that is used by the press. The means for sensing increments in scale weight may comprise a difference means. In the system there is also provided means for determining the number of gross signatures delivered from the press. Means are provided for determining the weight of paper delivered to the press by subtracting the waste weight per roll from the total initial weight of the corresponding roll. Means are provided for also determining the basis weight by providing a division between gross press signatures and weight of paper delivered to the press. Means are also provided for determining web break waste by comparing gross signatures with weight of paper delivered to the press.

BRIEF DESCRIPTION OF THE DRAWINGS

Numerous other objects features and advantages of the invention should now become apparent upon a reading of the following detailed description taken in conjunction with the accompanying drawings in which.

DETAILED DESCRIPTION

Figure 1:
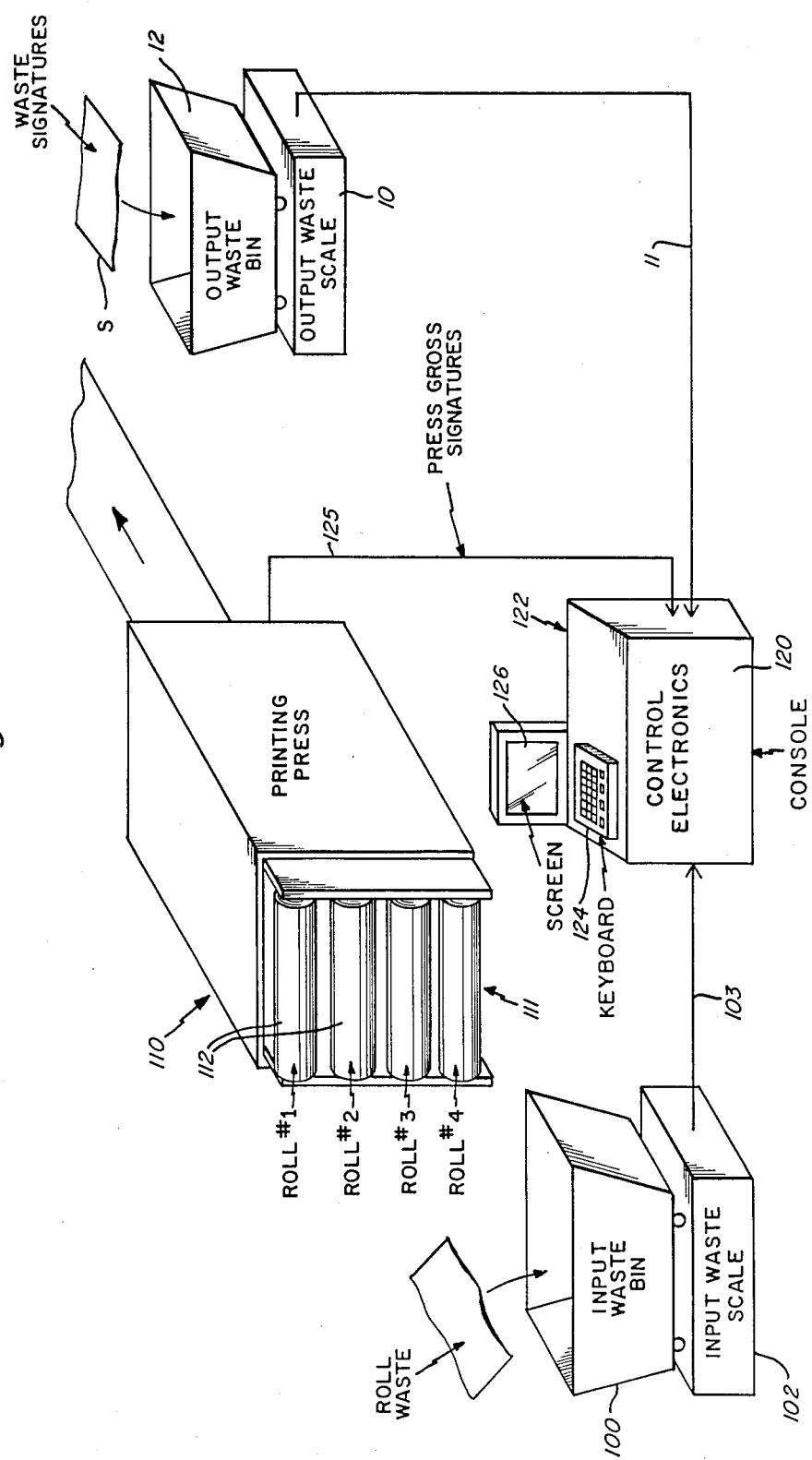
FIG. 1 is a schematic diagram of a paper monitoring system in accordance with the present invention.

In accordance with the present invention such as illustrated in the system diagram of FIG. 1, there is provided an input waste bin 100 which is disposed on an input waste scale 102. The approach is to place the waste bin directly onto the scale and to record the weight of waste put into it in association with each roll on an individual roll basis. In this way the net paper placed into the press is equal to the initial roll weight such as marked on the roll by the roll manufacturer reduced by the total waste weight. The paper remaining when the roll is removed from the web printing machine may be counted as core waste and may also be put into the input waste bin. Alternatively, the core waste may be accounted for separately. The final net weight of paper used in the press is equal to the weight of paper placed in the machine reduced by the roll weight at removal. With the technique of the present invention it is noted that the monitoring is more accurate and it is impossible to circumvent weighing because there is only one place for scrap paper namely directly in the waste bin which is always maintained on the scale. Furthermore, there are no added steps to slow the production printing process.

FIG. 1 shows the printing press 110 having at its input end a stack 111 of rolls 112. In FIG. 1 there are provided four rolls identified as rolls #1-#4. Although four rolls are illustrated usually only a single roll is fed to the printing press at a time.

FIG. 1 also shows the output waste bin 12 disposed on the output waste scale 10. An output line 11 couples the output waste scale 10 to the control electronics 120. The control electronics 120 is described in FIG. 1 as part of the overall console 122. The console 122 also includes a keyboard 124 and display screen 126. It is noted that there is also a further input on line 125 from the printing press to the control electronics 120. The signal on line 125 gives the press gross signatures, a count that is available at the output of the printing press.

In FIG. 1 there is also shown a line 103 coupling from the input waste scale to the control electronics 120. This is a signal that is representative of the weight on the input scale at any one period in time.

Figure 2:
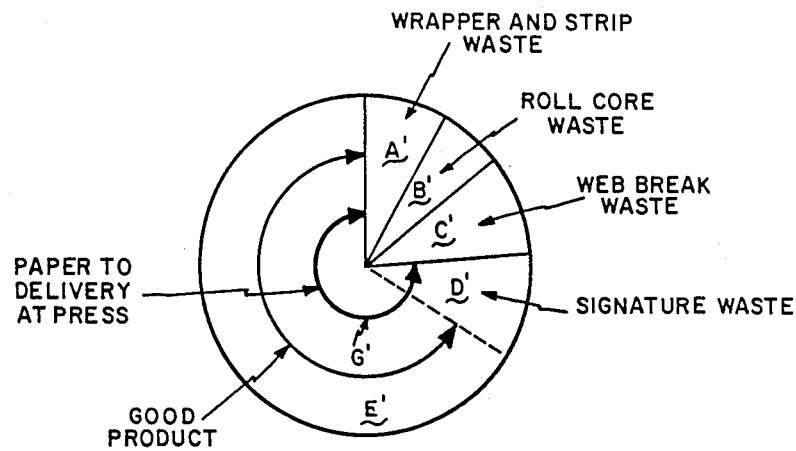
FIG. 2 is a sectional diagram illustrating paper waste consumption and individual categories thereof.

Reference is now made to FIG. 2 which is a diagram helpful in illustrating the different types of waste that are produced in association with a printing process. In this diagram the total circle is representative of the total weight of paper that is purchased and that is to be kept track of in association with the printing process. On this total paper weight portions of it are waste that occur both at the input of the printing operation and at the output thereof in the form of waste signature S. Thus, segment A' represents wrapper and strip waste from the roll. Segment B' represents core waste. Segment C' may be used to represent web break waste. Segment D' represents waste signatures at the output of the press. Thus, segment E' in FIG. 2 is representative of the good product. The segments E' and D' together (arrow G') represent the paper that is delivered to the press. It is noted in FIG. 2 that some of these segments are represented perhaps in larger percentage slices than might be the actual case simply for the purpose of explanation.

Figure 3:
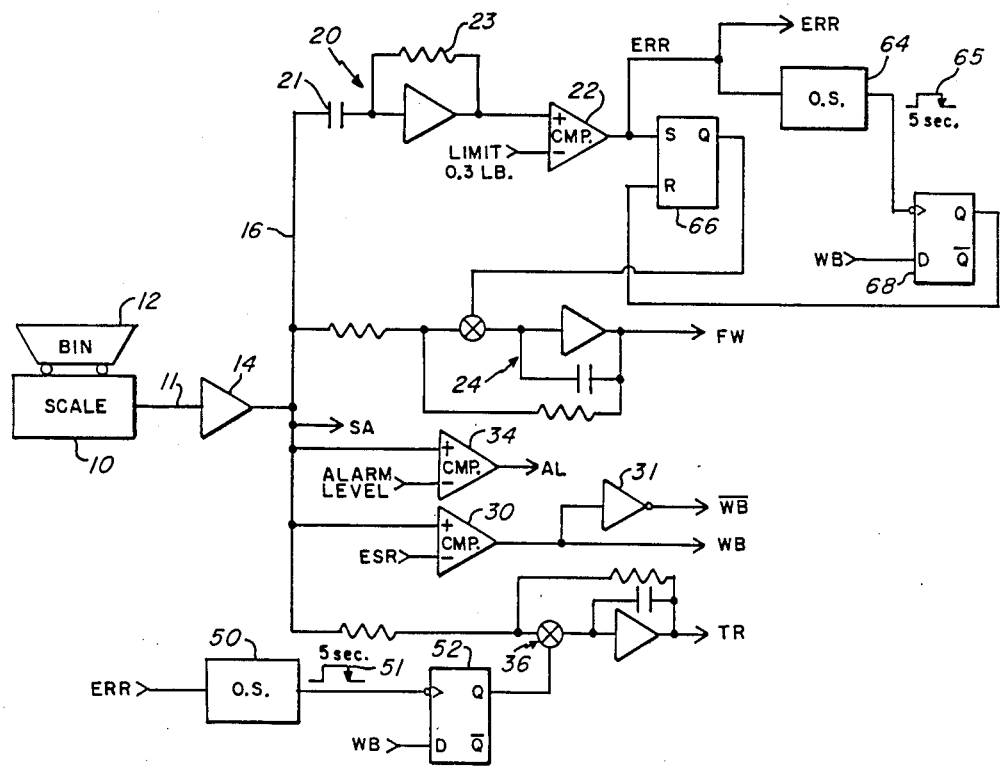
FIG. 3 is a schematic diagram showing a portion of one embodiment of weight detection circuitry.
Figure 4:
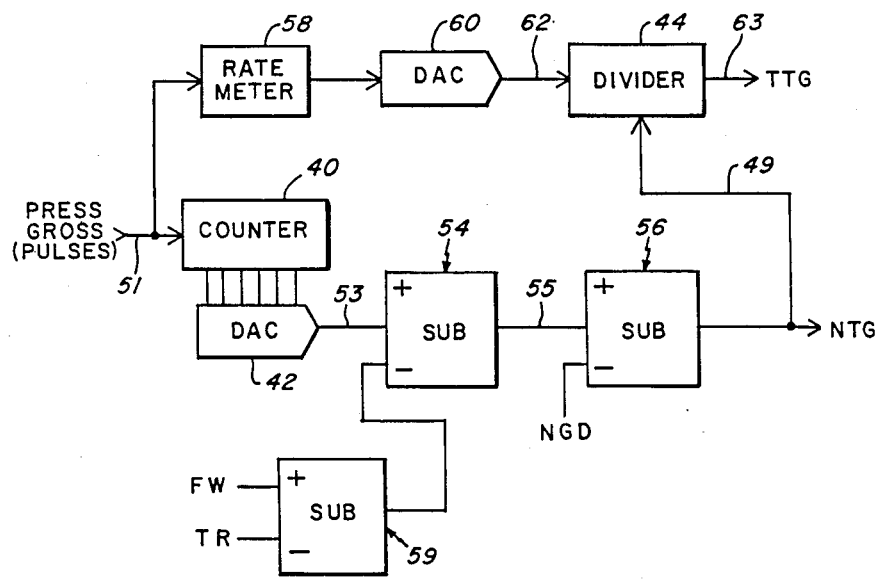
FIG. 4 is a schematic diagram showing an additional part of the system as it relates to FIG. 3.
Figure 5:
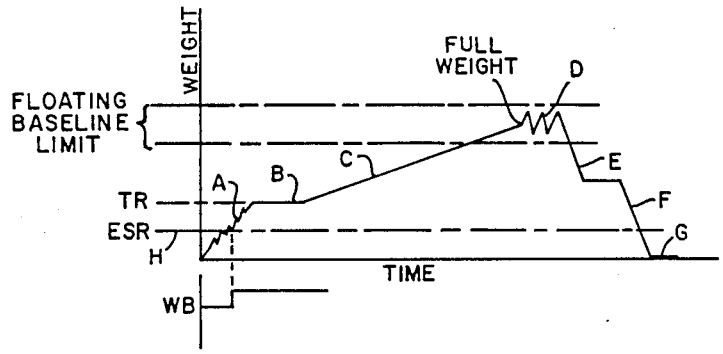
FIG. 5 is a time-weight graph useful in association with the diagrams of FIGS. 3 and 4.

With regard to the detections that occur in connection with the output waste bin 12 and output waste scale 10, reference is now made to FIGS. 3-5. All of the discussion relating to FIGS. 3-5 pertains to waste at the output end of the printing press.

FIGS. 3 and 4 together illustrate a portion of the control electronics 120 associated with the output detection. FIG. 5 is a graph of weight vs. time that is helpful in explaining the control.

The graph of FIG. 5 may be broken down into different segments. Segment A represents the time over which a storage bin or cart is placed upon the scale. This segment is shown as perhaps being somewhat erratic which occurs when a cart is rolled on to a scale. For at least a short segment B the weight is constant. This thus represents the tare weight as illustrated in FIG. 5. There is then a relatively long curve segment C which is representative of a period over which the waste paper is being deposited in the storage bin on the scale. The next segment is segment D which is shown as being cyclic representing erratic behavior that occurs as the storage cart is about to be removed from the scale. This erratic behavior is one of the parameters that is being sensed with the circuitry of FIG. 3.

When the first set of wheels from the cart passes from the scale this is represented by the drop in the graph at segment E. There is also shown a segment F which represents the transition off of the scale when the last wheel of the cart is removed from the scale.

In the embodiment of FIG. 3 there is shown the scale 10 with the storage bin 12 shown schematically above the scale 10. The scale 10 is of conventional design and is considered in FIG. 3 as having an analog output on line 11 that couples to an amplifier or driver 14 with the output thereof coupling to the common line 16 where the signal SA (scale analog) is generated. The bin 12 is for containing waste paper coming from a printing press or possibly from other like apparatus. The circuit of FIG. 3 is adapted to provide certain control signals particularly providing an automatic signal representative of tare weight. This is the signal TR shown in FIG. 3.

In FIG. 3, the description is in the form of analog circuitry. However, it is understood that it may be more advantageous to provide analogous digital control, preferably by means of computer hardware/software techniques.

In FIG. 3 the circuitry includes analog network 20 which has an output coupling to comparator 22. Another circuit that couples from the common line 16 is the sample and hold circuit 24. The output of this circuit provides the signal FW (full weight). Still another circuit that couples from the common line 16 is the comparator 30. This circuit provides the signal WB (waste bin on scale) and may also provide the negation of that signal. There is also shown a sample and hold circuit 36 and associated logic described in detail hereinafter. The sample and hold circuit 36 is for generation of the tare weight signal TR.

Associated with the sample and hold circuit 36 there is detection circuitry including a monostable multivibrator or one-shot 50 and flip-flop 52. The one-shot 50 receives the signal ERR (erratic). This is the signal taken from the output of the comparator 22.

Circuitry is also provided associated with the comparator 22 and the sample and hold network 24. This circuitry includes a multi-vibrator or one-shot 64 and flip-flops 66 and 68.

In FIG. 3 the comparator 22 is coupled to the common line 16 by way of the analog network 20. This network provides filtering by means of capacitor 21 and resistor 23 which essentially function as a differentiator to detect any appreciable change in weight sensed at the line 16. The signal LIMIT at the reference input to the comparator 22 is set at a level corresponding to 0.30 pounds so that if there is a change of weight of at least 0.30 pounds, then the comparator 22 is activated indicating an erratic condition. This may occur when the cart is placed on the scale (segment A, FIG. 5) or is removed (segment D, FIG. 5) from the scale, or when an operator stands upon the scale to retrieve the waste bin. However, the operator's weight is not included since it is normally difficult for the operator to keep his movement to less than 0.3 pounds. Thus, the signal FW is held to be the value just before the operator stepped on the scale and the signal FW resumes when the operator gets off the scale.

The signal ERR sets the flip-flop 66 and this signal also couples to the one-shot 64. Both the one-shot 64 and the one-shot 50 are retriggerable one-shots and the output shown in FIG. 3 from each of these has a five second duration. The purpose of the one-shots is to have a five second stable period. At the end of this period, at the falling edge 65 of the waveform, the flip-flop 68 is triggered by this negative going edge. The data input to the flip-flop 68 is the signal WB. The output of the flip-flop 68 couples to the reset input of the flip-flop 66. The assertion output of the flip-flop 66 in turn couples to the control input of the track and hold circuit 24.

The signal ERR taken from the output of the comparator 22, as indicated previously, is generated whenever a change in weight is detected at the scale greater than the limit reference at the reference input to the comparator 22. In one embodiment, this LIMIT reference is set at a voltage corresponding to 0.30 pounds of paper. Thus, each time that there is an output from the comparator 22, this signal sets the flip-flop 66. When the flip-flop 66 is set its output Q goes high causing the circuit 24 to hold and cease continuous sampling. Prior to the setting of flip-flop 66 the output Q is low controlling circuit 24 to sample or track.

The signal ERR also couples to the one-shot 64 which is a retriggerable one-shot. Thus, as long as the signal ERR is generated, the one-shot 64 is retriggered. However, at some point in time, after a predetermined time interval such as 5 seconds, after the one-shot 64 has timed out without being retriggered, there is a falling edge 65 that triggers the flip-flop 68. The flip-flop 68 senses the state of the signal WB. It is noted that it is the affirmative of this signal that couples to the data input of the flip-flop 68.

Thus, at the end of the one-shot time period, indicating a sufficient period of time over which erratic operation did not occur, then the flip-flop 68 determines whether the waste bin is on the scale or not. If the waste bin is on the scale as represented by the signal WB, then the flip-flop 68 is set by the falling edge 65 and this signal couples back to the flip-flop 66 to reset the flip-flop 66.

The bin removal or erratic signals may be used as an indication to carry out other tasks in the weighing system such as use in conjunction with conveyor control.

With reference to FIGS. 1 and 3, it can be assumed that operation commences by rolling the storage bin onto the scale 10. This is shown in FIG. 5 by the segment A. Note that during the segment A, the signal WB transitions high. Now, it is noted that the segment B in FIG. 5 is representative of a level that corresponds to the tare weight. The tare weight is detected by the smple and hold or tracking circuit 36 in combination with the one shot 50 and the flip-flop 52. Again, when the bin moves on to the scale, the signal ERR is generated and this is coupled to the one shot 50. After the signal ERR is absent for at least 5 seconds as determined by the one shot 50, then the output of the one shot 50 has a negative transition 51 that couples to the clock input of the flip-flop 52. If the signal WB is low, the output of the flip-flop at its output Q is low and this enables tracking of the circuit 36. However, the erratic signal that occurs during segment A, once it has settled-down for 5 seconds, the signal WB is high because the waste bin is then on the scale. Thus, when that setting of the flip-flop occurs, the Q output goes low and this holds the circuit 36 essentially holding the analog signal SA which becomes the tare weight signal representative of the weight of the cart alone prior to any filling of the cart as occurs along segment C in FIG. 5. Thus, the tare weight has been measured automatically and there is no need to keep track of tare weight for each different cart that may be employed. In the past separate tare weights were calculated for each cart and these tare weights were then separately used in making calculations. However, with the arrangement as illustrated in FIG. 3, now tare weight is detected automatically and there is no need to keep track of tare weight for each cart that might be employed.

The operation continues through segment C with the waste bin being filled. Refer to the signal LIMIT and the comparator 22. When the signal to the comparator 22 exceeds the LIMIT the signal ERR (erratic) is generated.

When the flip-flop 66 was previously reset, this caused tracking by the analog circuit 24. When the flip-flop 66 is set, this holds the final value of the analog signal on line 16, indicated in FIG. 3 as the signal FW to indicate a cumulative weight condition.

Now, should an erratic signal be generated, say during segment C if the operator should, for example, step onto the scale, this signal will cause a setting of the previously reset flip-flop 60. When this occurs, the output Q from the flip-flop 66 goes high and holds the analog signal at circuit 24. This has the effect of freezing the weight signal with tracking resuming only when the flip-flop 66 is reset. The erratic signal will continue and even though the one-shot 64 provides for a timing out, as indicated previously, it is very difficult for the operator to stand on the scale without causing some weight variation which will maintain the erratic signal. The erratic signal should only cease after the operator gets off of the scale. Then, the one-shot 64 times out and the trailing edge 65 clocks the flip-flop 68. Because the waste bin is still on the scale, the output of the flip-flop 68 is high causing a resetting of the flip-flop 66. This has the effect of resuming the tracking because the output Q from the flip-flop 66 now goes low which is indicative of its tracking mode. Furthermore, the tracking is resumed without having taken into effect that weight was added when the operator got onto the scale. As far as a system is concerned, the operator's weight is ignored.

FIG. 3 also shows the comparator 30 which receives the signal ESR shown as a threshold level H in FIG. 5. The signal ESR refers to an empty scale reference. When the analog signal from line 16 exceeds this reference, then the signal WB is generated, indicating that the waste bin is on the scale. It is noted that there is also provided in FIG. 3 an inverter 31 for providing the negation of the signal WB, i.e. WB—.

There is also provided alarm means for signaling when the weight reaches a point close to where bin removal would be advisable. In this regard refer to the alarm comparator 34 and the output signal AL. This is a signal that would be generated when the weight reaches a point close to the end of the segment C in FIG. 5.

In FIG. 5 there is shown the segment D which is illustrative of a point wherein the bin is removed from the scale again causing the erratic signal to be generated, namely, the signal ERR. This erratic signal also has the effect of setting the flip-flop 66 to provide a holding of the signal which in this case will be the true and final full weight signal. After the erratic signal ends and stability occurs for at last the aforementioned 5 seconds, then the signal at the output of the one-shot 64 transitions at the falling edge 65 to clock the flip-flop 68. However, the signal WB is then low and thus the output from the flip-flop 68 does not reset the flip-flop 66. This thus means that the full weight signal is temporarily held. The common occurrence of the clocking of the flip-flop 68 along with the WB signal being low is an indication that one is at a full weight condition and thus the signal at the output of the circuit 24 can then be detected to determine what this full weight condition is.

In addition to the aforementioned alarm signal AL provided in FIG. 3 to indicate that the weight is approaching the maximum capacity of the storage bin and scale, it is also advantageous to provide a signal to be displayed indicative of the time remaining before the printing run is complete. In this regard refer to FIG. 4 which shows a counter 40, digital to analog converter 42, analog networks 54 and 56, rate meter 58, digital to analog converter 60, and divider network 44. The counter 40 is shown as having a clock input at line 51. This is a pulse input from the printing press indicating the gross output from the press. The output of the counter 40 couples to the digital to analog converter 42 and thus the output of the converter 42 is an analog signal at line 53 representative of the present gross output of signatures from the press. This analog signal couples to the analog network 54 which is a difference or subtraction network. It is noted that this network also receives the signal FW which is the full weight signal. The signal on line 53 is one representative of a gross (total) count of signatures from the press while the signal FW is representative of the full weight. There is also provided in FIG. 4 an inversion circuit 59 which provides for subtraction of the tare weight. Thus, the waste count is actually represented by the full weight minus the tare weight and thus those two inputs to the subtraction network provide for a waste count. The gross count minus the waste count is representative of good signatures. The network 54 being a difference network thus provides at its output 55 an analog signal representative of the gross signatures minus waste signatures which provides an indication of the good signatures that have occurred from the press. This signal couples to the second analog network 56 which also receives a signal on line 57 referred to as the signal NGD (net good desired). This is a reference signal that may be set in a predetermined manner and is a signal of a magnitude representative of the net good signatures that are desired. The network 56 is also a difference or subtraction network and thus the output at line 59 is the signal NTG (needed-to-go) which is a signal indicative of the number of good signatures that are still required before the total number of good signatures is reached.

The pulse input signal on line 51 couples to a rate meter 58 which may be of conventional design providing a digital output that couples to the digital to analog converter 60. This arrangement provides for an analog signal at the output line 62 from the converter which is a signal representative of press speed. The signal on line 62 couples to the divider network 44. Also the divider network 44 receives the signal on line 59 mentioned previously. The output of the divider network is the signal TTG (time-to-go).

The time-to-go until the job is finished is represented by the ratio of the number of signatures that are still needed divided by the press speed. This division is carried out by the divider 44 which receives the signal representative of the press speed on line 62 and the second signal on line 59 which is representative of the number of signatures that are required to go. Thus, as indicated on the output line 63 from the divider 44 there is the signal TTG which is representative of the time-to-go until the desired number of total good signatures is obtained.

FIGS. 3–5 have been explained in connection with the accountability of waste at the output end of the web printing press. For example, with regard to the diagram of FIG. 4, the network 54 provides at its output at line 55 an analog signal representative of the gross signatures minus waste signatures which provides an indication of the good signatures or the good product from the press. With reference to FIG. 1 it is noted that there is a press gross signatures signal on line 125 that couples from the printing press to the control electronics. This may in fact be the same signal identified in FIG. 4 as the press gross signal on line 51 coupling to the counter 40. A corresponding analog signal is also provided at line 53 in FIG. 4. The signal on line 53 in FIG. 4 is a signal that is representative of a gross count of signatures from the press. This signal may be represented and processed as either a digital or analog signal.

Figure 6:
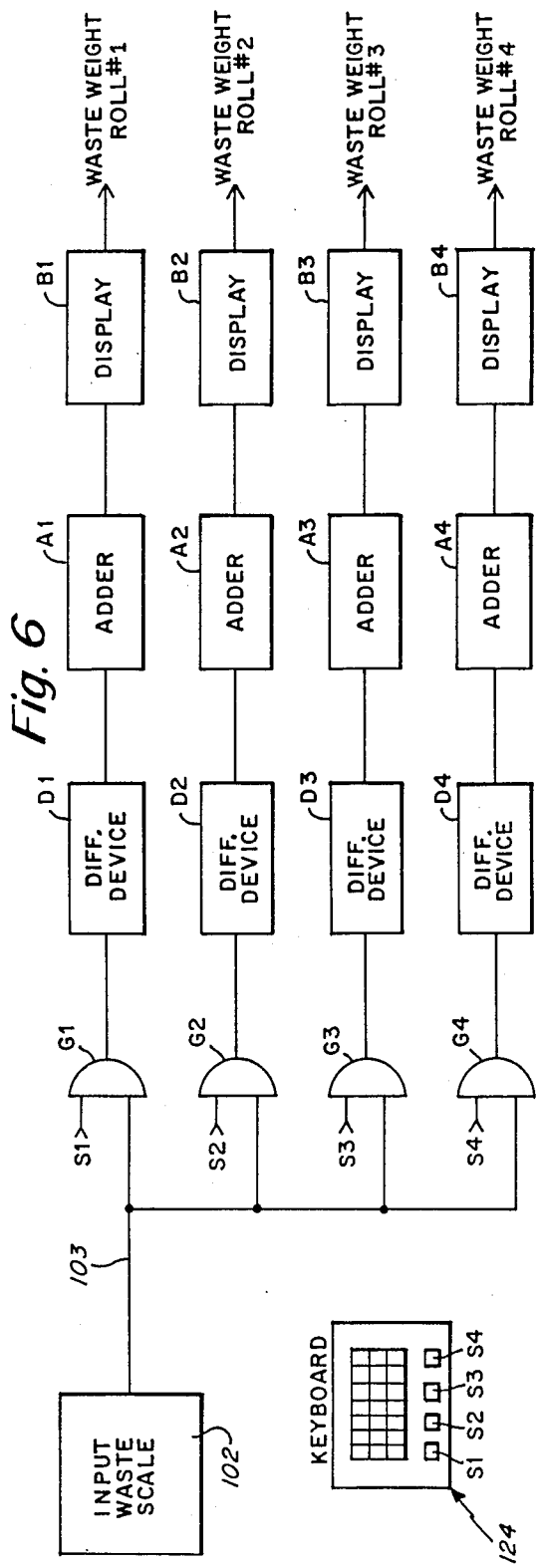
FIG. 6 is a block diagram associated with the input waste detection electronics for providing at the output thereof individual waste signals for each roll.

On the input side of the printing operation as identified previously, there is an input waste bin 100 disposed upon input waste scale 102. In FIG. 1 reference has been made to the output at line 103 from the input waste scale to the control electronics 120. In this regard reference is also now made to FIG. 6 which also shows the input waste scale 102 along with the output line 103. FIG. 6 shows further details of the control electronics 120 of FIG. 1.

Figure 7:
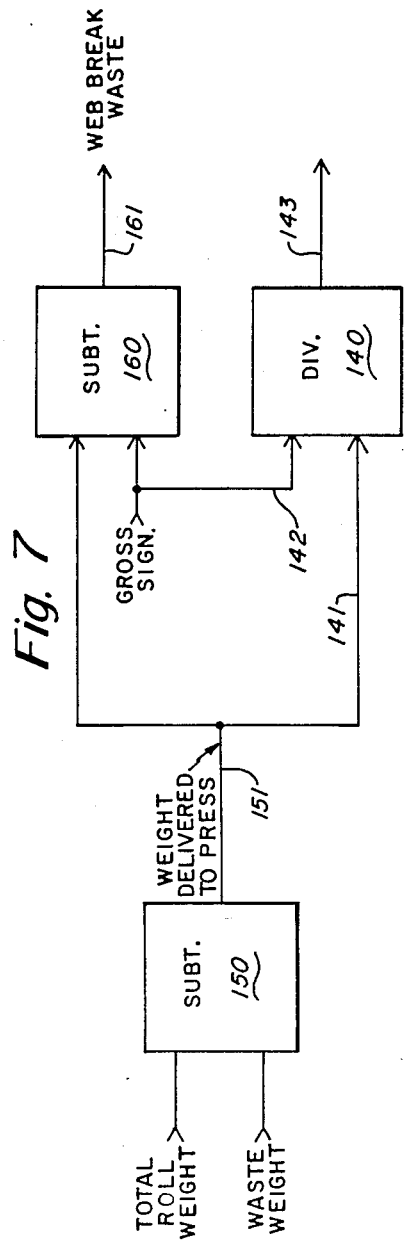
FIG. 7 is a block diagram of a circuit for providing, inter alia, a basis weight.

As indicated previously, in accordance with the invention it is desired to use the waste bin itself directly on a scale to record the weight of waste. The operator determines from which roll the waste is coming and then manually provides control via the keyboard 124 to direct the electronics to accumulate waste only as being derived from a single roll at a time. Because the printing press basically accepts only a single roll in the printing operation at a time then the control electronics can determine the total quantity of waste associated with a particular roll. Also knowing the original weight of the roll as typically marked on the roll by the manufacturer, the control electronics can then determine the net weight of paper that is used in the printing operation. Again, reference is made to the diagram of FIG. 2 which shows in segments A, B and C the particular types of waste that occur in association with the input waste scale. Refer also to FIG. 7 which is discussed in further detail hereinafter and which shows circuit 150 for providing a signal representative of weight of product delivered to the press.

With reference to FIG. 6, there is illustrated the input waste scale 102 which has an output on line 103 representative of the weight on the scale. Digital scales are well-known and the output signal on line 103 may in fact be a multi-line signal representative of a count corresponding to weight. This signal is coupled to a series of gates G1, G2, G3 and G4. These gates are represented in FIG. 6 as AND gates that also receive the respective selection signals S1, S2, S3 and S4. The gates G1–G4 carry out the demarcation of weight increments and are enabled on a mutually exclusive basis by the selection signals S1–S4. Also note in FIG. 6 the keyboard 124 which shows corresponding selection buttons S1, S2, S3 and S4. Also refer to the display 126 illustrated in FIG. 1. The buttons S1–S4 are only shown for illustration, it being understood that other combinations of entries may be used to provide the desired roll selection.

The operator of the apparatus selects via the keyboard which of the rolls is the particular roll that is in operation and for which waste is to be accumulated. This is typically the roll that is now being used as an input roll to the printing press. In FIG. 1 this may be roll #1. If it is the roll identified as roll #1 and each of these rolls is so identified, then the selection signal S1 occurs enabling only the gate G1. The gates G2, G3 and G4 are not enabled by their respective signals S2, S3 and S4 because the system operates so that only one waste weight accumulation occurs for a specific roll at a time. All waste is accumulated in the single bin even though the electronics house-keeps which roll is being monitored.

In FIG. 6 the output of the gates G1–G4 couple to respective difference devices or subtractors D1, D2, D3 and D4. Similarly, the output from the devices D1–D4 coupled to respective adders A1, A2, A3 and A4. The output of the adders A1–A4 couple to respective display devices B1, B2, B3 and B4. As indicated in FIG. 6 the output at the displays is representative of waste weight for the respective rolls identified herein as rolls #1–#4.

Each of the difference devices, adders and displays illustrated in FIG. 6 operate in the same manner. From the previous example, assuming that the signal S1 is selected then only gate G1 is enabled and thus the waste scale value on line 103 is coupled only to the difference device D1. The difference device D1 as well as the other devices D2–D4 may be conventional devices in the form of a subtractor or the like device. It may have a clock input and also has storage capability. There may also be included some type of a sample and hold circuit therein. The difference device simply stores an indication of the present count which occurs when the signal S1 first occurs and then compares that with a subsequent count under control of some type of an input clock (not shown). Each of these devices thus provide an output therefrom that is representative of the increment in weight in the form of an increment count corresponding to the waste weight associated with a particular roll. This increment count may be provided in either analog or digital form.

The output of the difference device couples to an adder which simply adds all of the increments in weight detected by the difference device. Each of the adders essentially provides a cumulative weight storage associated with a particular roll. The displays then display this waste weight on a per roll basis. The other gates and associated circuits operate in the same manner as the gate G1. Only one of the signals S1–S4 is provided at any one time because the system is keeping track of only waste from a single roll at a time. Interlock circuitry may be provided as part of the control to assure that only one of the signals S1–S4 can be activated at a time.

In the example previously given, there was considered to be initially taken waste from roll #1. After the waste has been totally taken from this roll, then it is assumed that the weight on the scale 102 is at some predetermined amount. The operator then selects signal S2 relating waste weight now to the roll #2 and in this way enables only gate G2 with gates G1, G3 and G4 being inhibited. The difference device D2 then starts at an initial reading that may correspond to the previous waste on the scale from the first roll. The adder A2 then accumulates weight associated with roll #2. The same thing also occurs for subsequent rolls for which the waste is being accumulated. When the waste bin is full then the system has stored therein signals representative of the waste weight for each individual roll.

It is also to be realized that all of these individual waste weight indications are carried out on a per roll basis with a single input scale by measuring the increment in scale weight as occasioned by waste from each separate roll.

With further reference to FIG. 1, it is noted that in FIG. 1 the complete system is illustrated in which signals are coupled to the control electronics both from the input and output scales as well as from the press itself. In this connection also refer to FIG. 7 which shows the divider 140. The purpose of the diagram of FIG. 7 is to illustrate, inter alia, the calculation of basis weight or weight per unit area of paper or per signature. This may also be expressed as the alternate ratio of impressions or signatures produced in a pound of paper delivered to the press. In this connection the input signals include weight delivered to the press at line 141 and the gross signatures input at line 142. The output is at line 143. Depending upon the particular type of output desired at line 143 the divider can operate to divide the signal on line 141 by the signal on line 142 or alternatively divide the signal on line 142 by the signal on line 141. If the total weight delivered to the press is divided by the number of gross signatures this provides an output indicating pounds or other weight unit per area of paper or per signature. The alternate division that divides the number of gross signatures by weight delivery to the machine provides a signal of the number of signatures per pound or other weight parameter.

For example, if the number of total gross signatures are 10,000 and the weight is 100 pounds then the output at line 143 may either read 100 signatures per pound or 0.01 pounds per signature. In connection with the input signals to the divider 140 in FIG. 7 the total delivery into the machine is the segment in FIG. 2 illustrated by the arrow G'. This represents the total roll weight minus the input waste. The input waste may be considered as the sum of segments A', B' and C' in FIG. 2. With regard to the signal on line 142 which is the gross signatures, this is the signal in FIG. 4 which may be the signal at line 53 which is representative of the gross output of signatures of the press. Again this can be represented as an analog or digital signal.

With further reference to FIG. 2, it is noted that one segment, namely segment C' in the diagram accounts for web break waste. At the time of a web break, continuity of paper flow in the machine is interrupted. Most of the paper is removed from the machine and may be discarded. In accordance with one form of operation the paper may be disposed in the waste bin to be accumulated as waste associated with the particular roll that is being fed. In accordance with another embodiment of operation the paper lost in a web break may be accounted for by recognizing when paper is entering the machine as recorded at the splices between rolls with no paper leaving the machine at the output delivery.

In the event of a web break, sensors in the press detect the absence of a taut paper web on some part of the web path. The sensor signal acts to minimize loss of material and to prevent damage by activating the press drive emergency stop function and causing security devices to cut the web at selected points to prevent paper from wrapping up on press cylinders. Depending on the location of the break and on the state of the remaining web, part or all of the papers in the press may be removed and discarded. After clean-up, paper is threaded through the press from the splicer and operation is resumed.

In accordance with the invention the paper monitoring occurs by measuring all paper fed into the press and also all paper fed out of the delivery from the time of the break until the rate of paper delivery is equal to the rate of entry. The difference between the paper delivered to the press and the output from the press is accounted as paper lost in the web break.

Thus, reference is made again to FIG. 7 which shows, in addition to the divider 140, also subtractors 150 and 160. The subtractor 150 simply receives a signal indicating the total roll weight which is constant for each roll and also an input signal indicating waste weight. The output of the subtractor 150 is a signal at line 151 that indicates weight of product delivered to the press. Reference has been made previously to this signal coupled on line 141 to the divider 140. FIG. 7 also shows the input signal on line 142 indicating gross signatures.

The subtractor 160 receives the signal from line 151 indicating the weight of product delivered to the press and also receives a signal indicating gross signatures. The subtractor 160 makes a comparison between these two signals to thus provide at its output 161, a signal representative of paper lost in the web break identified in FIG. 7 as web break waste. In connection with the two inputs to the subtractor 160, it is noted that input signals may have to be normalized so that a comparison can be made between the weight delivered to the press and gross signatures. The number of signatures correlates to the weight by virtue of the signal indicating basis weight. In this way the subtractor 160 can be nulled so as to indicate an output parameter or output count indicating the magnitude of web break waste as it relates to the two inputs. If there is no web break, then the gross signature signal is essentially equal to the signal on line 151 and there is no output from the subtractor 160. However, if there is a web break, then the number of gross signatures will decrease because waste has occurred in the printing operation and this will be indicated at the output on line 161.

Having now described a limited number of embodiments of the present invention, it should now be apparent to those skilled in the art that numerous other embodiments and modifications thereof are contemplated as falling within the scope of the present invention as defined by the appended claims.

What is claimed is:

1. A system for monitoring paper consumption in association with a web printing press having the capability of monitoring paper delivery to the press from multiple rolls, said system comprising, an input waste scale, an input waste bin adapted to be disposed on the input waste scale, said input waste scale providing for the continuous registration of waste in sequence from the multiple rolls and having an output signal continuously representative of waste weight, separate means each responsive to said scale signal for sensing increments in scale weight for each respective roll to provide a total of waste weight per roll, and control means including means operator initiated for enabling only one of said separate means for sensing so as to accumulate waste weight only associated with a selected roll.

2. A system as set forth in claim 1 wherein said means for sensing increments in scale weight comprises a difference means.

3. A system as set forth in claim 1 further including an output waste scale and an output waste bin adapted to be disposed on the output waste scale.

4. A system as set forth in claim 3 wherein said output waste scale provides for the continuous registration of waste in the form of waste signatures from the printing press.

5. A system for monitoring paper consumption in association with a web printing press having the capability of monitoring paper delivery to the press from multiple rolls, said system comprising, an input waste scale, an input waste bin adapted to be disposed on the input waste scale, said input waste scale providing for the continuous registration of waste in sequence from the multiple rolls and having an output signal continuously representative of waste weight, separate means each responsive to said scale signal for sensing increments in scale weight for each respective roll to provide a total of waste weight per roll, and control means including means operator initiated for enabling only one of said separate means for sensing so as to accumulate waste weight only associated with a selected roll, said means for sensing increments in scale weight comprising a difference means, and means for determining the number of gross signatures delivered from the press.

6. A system as set forth in claim 5 including means for determining the weight of paper delivered to the press by subtracting the waste weight per roll from the total initial weight of the corresponding roll.

7. A system as set forth in claim 6 including means for determining the basis weight by providing a division between gross press signatures and weight of paper delivered to the press.

8. A system as set forth in claim 7 including means for determining web break waste by comparing gross signatures with weight of paper delivered to the press.

9. A system for monitoring paper consumption in association with a web printing press having the capability of monitoring paper delivery to the press from multiple rolls, said system comprising, an input waste scale, an input waste bin adapted to be disposed on the input waste scale, said input waste scale providing for the continuous registration of waste in sequence from the multiple rolls and having an output signal continuously representative of waste weight, separate means each responsive to said scale signal for sensing increments in scale weight for each respective roll to provide a total of waste weight per roll, and output waste scale and an output waste bin adapted to be disposed on the output waste scale, said output waste scale providing for the continuous registration of waste in the form of waste signatures from the printing press, and means for determining the number of gross signatures delivered from the press.

10. A system as set forth in claim 9 including means for determining the weight of the paper delivered to the press by subtracting the waste weight per roll from the total initial weight of the corresponding roll.

11. A system as set forth in claim 10 including means for determining the basis weight by providing a division between gross press signatures and weight of paper delivered to the press.

12. A method for monitoring paper consumption in association with a web printing press having the capability of monitoring paper delivery to the press from multiple rolls, comprising the steps of, providing an input waste scale for measuring waste weight to provide continuous registration of waste in sequence from the multiple rolls, sensing separate increments in scale weight for each respective roll to provide a total of waste weight per roll, determining the weight of paper delivered to the press by subtracting the waste weight per roll from the total initial weight of the corresponding roll, and determining the basis weight by providing a division between gross press signatures and weight of paper delivered to the press.

13. A system for monitoring paper consumption in association with a web printing press comprising,
an input waste scale means,
an input waste bin adapted to be disposed on the input waste scale means,
said input waste scale means providing for the continuous registration of input waste,
an output waste scale means,
an output waste bin adapted to be disposed on the output waste scale means,
said output waste scale means providing for the continuous registration of output waste signatures,
means for subtracting the input waste from the total roll weight to determine weight of paper delivered to the press,
and means for subtracting waste signature from press gross signature count to determine good output signature.

14. A system as set forth in claim 13 wherein the system monitors paper delivery to the press from multiple rolls.

15. A system as set forth in claim 14 including separate means each responsive to said scale signal associated with the input scale means for sensing increments in scale weight for each respective roll to provide a total of input waste weight per roll.

16. A system as set forth in claim 15 further including control means comprising means that is operator initiated for enabling only one of said separate means for sensing so as to accumulate waste weight only associated with a selected roll.

17. A system as set forth in claim 16 wherein said means for sensing increments in scale weight comprises a difference means.

18. A system
for monitoring paper consumption in association with a web printing press comprising,
an input waste scale means,
an input waste bin adapted to be disposed on the input waste scale means,
said input waste scale means providing for the continuous registration of input waste,
an output waste scale means,
an output waste bin adapted to be disposed on the output waste scale means,
said output waste scale means providing for the continuous registration of output waste signatures,
means for subtracting the input waste from the total roll weight to determine weight of paper delivered to the press,
and means for subtracting waste signature from press gross signature count to determine good output signature,
said system monitoring paper delivery to the press from multiple rolls,
separate means each responsive to said scale signal associated with the input scale means for sensing increments in scale weight for each respective roll to provide a total of input waste weight per roll,
control means comprising means that is operator initiated for enabling only one of said separate means for sensing so as to accumulate waste weight only associated with a selected roll,
and means for determining the number of gross signatures delivered from the press.

19. A system
for monitoring paper consumption in association with a web printing press comprising,
an input waste scale means,
an input waste bin adapted to be dispoed on the input waste scale means,
said input waste scale means providing for the continuous registration of input waste,
an output waste scale means,
an output waste bin adapted to be disposed on the output waste scale means,
said output waste scale means providing for the continuous registration of output waste signatures,
means for subtracting the input waste from the total roll weight to determine weight of paper delivered to the press,
and means for subtracting waste signature from press gross signature count to determine good output signature,
said system monitoring paper delivery to the press from multiple rolls,
separate means each responsive to said scale signal associated with the input scale means for sensing increments in scale weight for each respective roll to provide a total of input waste weight per roll,
control means comprising means that is operator initiated for enabling only one of said separate means for sensing so as to accumulate waste weight only associated with a selected roll,
and means for determining the basis weight by providing a division between gross press signatures and weight of paper delivered to the press.

20. A system as set forth in claim 19 including means for determining web break waste by comparing gross signatures with weight of paper delivered to the press.

21. A system for monitoring paper consumption in association with a web printing press having the capability of monitoring paper delivery to the press from multiple rolls, said system comprising, an input waste scale, an input waste bin adapted to be disposed on the input waste scale, said input waste scale providing for the continuous registration of waste in sequence from the multiple rolls and having an output signal continuously representative of waste weight, separate means each responsive to said scale signal for sensing increments in scale weight for each respective roll to provide a total of waste weight per roll, control means including means operator initiated for enabling only one of said separate means for sensing so as to accumulate waste weight only associated with a selected roll, and means for determining the number of gross signatures delivered from the press.

22. A system as set forth in claim 21 including means for determining the weight of paper delivered to the press by subtracting the waste weight per roll from the total initial weight of the corresponding roll.

23. A system as set forth in claim 20 including means for determining the basis weight by providing a division between gross press signatures and weight of paper delivered to the press.

24. A system as set forth in claim 23 including means for determining web break waste by comparing gross signatures with weight of paper delivered to the press.

25. A system as set forth in claim 21 further including an output waste scale and an output waste bin adapted to be disposed on the output waste scale.

26. A system as set forth in claim 25 wherein said output waste scale provides for the continuous registration of waste in the form of waste signatures from the printing press.

27. A system as set forth in claim 26 including means for determining the number of gross signatures delivered from the press.

28. A system as set forth in claim 27 including means for determining the weight of the paper delivered to the press by subtracting the waste weight per roll from the total initial weight of the corresponding roll.

29. A system as set forth in claim 28 including means for determining the basis weight by providing a division between gross press signatures and weight of paper delivered to the press.

30. A method for monitoring paper consumption in association with a web printing press having the capability of monitoring paper delivery to the press from multiple rolls, comprising the steps of, providing an input waste scale for measuring waste weight to provide continuous registration of waste in sequence from the multiple rolls, sensing separate increments in scale weight for each respective roll to provide a total of waste weight per roll, and determining the basis weight by providing a division between gross press signatures and weight of paper delivered to the press.

* * * * *